United States Patent
Choi et al.

(10) Patent No.: US 7,957,340 B2
(45) Date of Patent: *Jun. 7, 2011

(54) METHOD OF ALLOCATING FREQUENCY SUBBAND AND APPARATUS ADOPTING THE SAME

(75) Inventors: Yun-hwa Choi, Seoul (KR); Hyong-uk Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 753 days.

This patent is subject to a terminal disclaimer.

(21) Appl. No.: 11/865,421

(22) Filed: Oct. 1, 2007

(65) Prior Publication Data

US 2008/0019346 A1    Jan. 24, 2008

Related U.S. Application Data

(62) Division of application No. 10/942,948, filed on Sep. 17, 2004, now Pat. No. 7,551,594.

(30) Foreign Application Priority Data

Sep. 17, 2003   (KR) .............................. 2003-064586

(51) Int. Cl.
*H04W 4/00* (2009.01)
(52) U.S. Cl. ... 370/328; 370/329; 370/343; 370/395.41; 370/468; 455/509
(58) Field of Classification Search .................. 370/328, 370/395.41, 468, 329, 343; 455/188.1
See application file for complete search history.

(56) References Cited

U.S. PATENT DOCUMENTS

| 5,610,907 | A | 3/1997 | Barrett |
| 7,068,715 | B2 | 6/2006 | Hoctor et al. |
| 2003/0058924 | A1 | 3/2003 | Darby et al. |
| 2003/0069026 | A1 | 4/2003 | Hoctor et al. |
| 2004/0120424 | A1* | 6/2004 | Roberts ......................... 375/327 |
| 2004/0156335 | A1* | 8/2004 | Brethour et al. .............. 370/329 |
| 2005/0003769 | A1* | 1/2005 | Foerster et al. ............... 455/113 |
| 2005/0036571 | A1* | 2/2005 | Shvodian et al. ............. 375/316 |

FOREIGN PATENT DOCUMENTS

| EP | 1 292 043 A1 | 3/2003 |
| JP | 2003-51761 A | 2/2003 |
| JP | 2003-169000 A | 6/2003 |

OTHER PUBLICATIONS

Communication dated Jun. 1, 2010 from the Korean Intellectual Property Office in counterpart Korean Application 10-2003-0064586.

* cited by examiner

*Primary Examiner* — Seema S Rao
*Assistant Examiner* — Sai-Ming Chan
(74) *Attorney, Agent, or Firm* — Sughrue Mion, PLLC

(57) ABSTRACT

A method of allocating frequency subbands in an ultrawideband (UWB) wireless communication system and an apparatus adopting the same are provided. The method of allocating frequency subbands to a device in a communication system, the method including: (a) determining whether usage of a first frequency band including upper frequency subbands is necessary; and (b) if it is determined that the usage of the first frequency band is necessary, not setting usage permission for the first frequency band to the device and not granting access to the first frequency band if a request for usage of the first frequency band is received from the device. When generation of a new piconet is necessary or generation of a new piconet is requested in a multi-piconet environment, since subbands of a high frequency group are allocated through negotiation, frequency resources are efficiently managed.

6 Claims, 8 Drawing Sheets

7 BANDS

| 0 | 1 | 2 | 3 | 4 | 5 | 6 |
|---|---|---|---|---|---|---|
| 0 | 2 | 4 | 6 | 1 | 3 | 5 |
| 0 | 3 | 6 | 2 | 5 | 1 | 4 |
| 0 | 4 | 1 | 5 | 2 | 6 | 3 |
| 0 | 5 | 3 | 1 | 6 | 4 | 2 |
| 0 | 6 | 5 | 4 | 3 | 2 | 1 |

| S1 | 1 | 2 | 3 | 4 | 5 | 6 | 7 |
| --- | --- | --- | --- | --- | --- | --- | --- |
| S2 | 1 | 3 | 5 | 7 | 2 | 4 | 6 |
| S3 | 1 | 4 | 7 | 3 | 6 | 2 | 5 |
| S4 | 1 | 5 | 2 | 6 | 3 | 7 | 4 |
| S5 | 1 | 6 | 4 | 2 | 7 | 5 | 3 |
| S6 | 1 | 7 | 6 | 5 | 4 | 3 | 2 |

FIG. 6

| PICONET 1 | 0 | 1 | 2 | 3 | 4 | 5 | 6 | | 0' | 1' | 2' | 3' | 4' | 5' | 6' |
|---|---|---|---|---|---|---|---|---|---|---|---|---|---|---|---|
| ⋮ | 0 | 3 | 6 | 2 | 5 | 1 | 4 | | | | | | | | |
| PICONET 6 | 0 | 6 | 5 | 4 | 3 | 2 | 1 | | | | | | | | |

LOW FREQUENCY GROUP       HIGH FREQUENCY GROUP

METHOD OF ALLOCATING FREQUENCY SUBBAND AND APPARATUS ADOPTING THE SAME

This is a divisional of application Ser. No. 10/942,948 filed Sep. 17, 2004 now U.S. Pat. No. 7,551,594, which claims benefit from Korean Application No. 2003-64586, filed Sep. 17, 2003. The entire disclosure of the prior application, application Ser. No. 10/942,948 is hereby incorporated by reference.

BACKGROUND OF THE INVENTION

This application claims the priority of Korean Patent Application No. 2003-64586, filed on Sep. 17, 2003, in the Korean Intellectual Property Office, the disclosure of which is incorporated herein in its entirety by reference.

1. Field of the Invention

The present invention relates to a wireless communication system, and more particularly, a method of allocating frequency subbands in an ultrawideband (UWB) wireless communication system and an apparatus adopting the same.

2. Description of the Related Art

Much research has gone into finding methods utilizing a frequency band in an ultrawideband (UWB) wireless communication system with a very wide range of frequency bandwidth. Unlike wireless data transmission technology used in cellular mobile communication, satellite communication, and TV broadcasting in which a transmission data stream is carried on a reference frequency waveform called an RF carrier, in UWB technology, a data stream is transmitted by representing data of logic 0 and logic 1 by repeatedly generating a plurality of pulses with equal periods and a constant waveform without using a carrier, each pulse with a period shorter than 1 nanosecond.

That is, the UWB technology is a wireless communication technology in which a data stream is transmitted using a plurality of pulses playing a role similar to Morse code. For example, a data stream is transmitted by generating a plurality of pulses with a very short period (hundreds picoseconds) with a constant interval between each of the pulses and modulating the pulses by adjusting periods of the pulses with a short time (±Dt) before and after a predetermined time so that −Dt is used for transmitting logic 0 and +Dt is used for transmitting logic 1. Pluralities of data can be transmitted using the coded pulse signal.

FIG. 1 illustrates a network topology according to the IEEE 802.15.3 standard.

A network includes a plurality of devices 101 through 104 and a piconet coordinator (PNC) 105 which relays and manages data and commands among the devices 101 through 104. A piconet is a network including a plurality of devices and a PNC. The devices may be home appliances, such as TVs and camcorders, and any of the devices can be the PNC 105. However, in general, an audio/video (AV) receiver or a computer is the PNC 105. The PNC 105 receives a channel time request command from each of the devices 101 through 104 and allocates a channel time to each of the devices 101 through 104. Each of the devices 101 through 104 directly transmits data to other devices at the allocated channel time. The PNC 105 also performs power save mode management and authentication management. Through the authentication management, the PNC 105 distributes a key for protecting a payload, and each of the devices 101 through 104 transmits and receives encrypted data using the allocated timeslot and the distributed key. A multi-piconet is a network including a plurality of piconets.

FIG. 2 illustrates a distribution of a frequency band in a conventional UWB wireless communication system.

Referring to FIG. 2, a UWB frequency band allocated from 3.1 GHz to 10.6 GHz is divided into 16 subbands, each subband with a 520 MHz bandwidth. Bands 0 through 7 are defined as a low frequency group 210, a band 8 220 is a reserved band reserved for a new UWB communication system such as the ZIGBEE, and bands 9 through 15 are defined as a high frequency group 230. One of the subbands in the low frequency group 210 is not used in order to reduce interference in systems having a 5 GHz band allocated for a wireless LAN service as defined in the IEEE 802.11a standard. Therefore, the low frequency group 210 also has 7 usable frequency subbands.

FIG. 3 illustrates frequency hopping sequences used for the distribution of the frequency band of FIG. 2.

Referring to FIG. 3, 6 frequency hopping sequences suggested by a multi-user access method of a UWB wireless communication system that supports a multi-piconet in a wireless personal area network (WPAN) of the IEEE 802.15.3 standard are illustrated. A pulse is generated during a dwell time such that a 7-subband sequence is not duplicated among the 6 frequency hopping sequences, thus allowing 6 piconets to use the 6 frequency hopping sequences. Data is transmitted by generating a second pulse signal in a next subband of the frequency hopping sequences. The data to be transmitted is determined according to the generated pulse stream, wherein the pulse stream is generated by a UWB sender (not shown).

FIG. 4 illustrates another distribution of a frequency band in a conventional UWB wireless communication system.

Referring to FIG. 4, 15 frequency subbands with 520 MHz bandwidths are allocated for a UWB frequency band. Except one frequency subband corresponding to a 5 GHz wireless LAN frequency band defined in the IEEE 802.11a standard, 14 frequency subbands are used. The 14 frequency subbands are divided into a low frequency group and a high frequency group, each group having 7 frequency subbands.

FIG. 5 illustrates frequency hopping sequences used for the distribution of the frequency band in FIG. 4.

The sequences include 6 frequency hopping sequences. A pulse is generated during a dwell time such that a 7 subband sequence is not duplicated among the 6 frequency hopping sequences, thus allowing 6 piconets to use the 6 frequency hopping sequences. Data is transmitted by generating a second pulse signal in a next subband of the frequency hopping sequences.

In both of the embodiments, 6 frequency hopping sequences are designed so that frequency subbands are not duplicated. First frequency subbands of the 6 frequency hopping sequences are all the same because the first frequency subband is used as a reference frequency subband to easily search existing frequency hopping sequences when a new piconet is generated.

In a multi-user handling method in which one frequency hopping sequence is used simultaneously by a plurality of piconets in a multi-band UWB system suggested as a standard for a physical layer of a WPAN, even though the frequency hopping sequence is designed such that frequency subbands can be used flexibly according to a data transmission capacity of a single piconet by dividing the frequency subbands into a low frequency group and a high frequency group, the method cannot support more than 6 piconets. Furthermore, since subbands of the high frequency group are not used in a piconet in which a low data transmission rate is required, frequency usage efficiency is low.

Most multi-band UWB systems support a multi-piconet using frequency hopping sequences using the frequency hopping sequence algorithm described above. However, since the algorithm supports a maximum of 6 piconets at any given time and does not use subbands of a high frequency group in a piconet in which a low data transmission rate is required, a waste of frequencies occurs.

SUMMARY OF THE INVENTION

The present invention provides a method of allocating frequency subbands capable of efficiently using frequency subbands of a high frequency group and an apparatus adopting the same.

According to an aspect of the present invention, there is provided a method of allocating frequency subbands to a device in a communication system, the method comprising: (a) determining whether usage of a first frequency band including upper frequency subbands is necessary; and (b) if it is determined that the usage of the first frequency band is necessary, not setting usage permission for the first frequency band to the device and not granting access to the first frequency band although a request for usage of the first frequency band is received from the device.

It is preferable that step (b) further comprises: if it is determined that the usage of the first frequency band is unnecessary, granting access to the first frequency band when a request for usage of the first frequency band is received from the device.

It is preferable that the communication system uses an ultrawideband.

According to an aspect of the present invention, there is provided a method of requesting frequency subband allocation in a communication system which uses frequency subbands at predetermined intervals, the method comprising: (a) scanning subbands of a second frequency band including lower frequency subbands and determining whether all of the lower frequency subbands are used; (b) if it is determined that all of the lower frequency subbands are used, joining a piconet as a member device; (c) requesting a subband of a first frequency band including upper frequency subbands; and (d) receiving a grant signal.

It is preferable that the communication system uses an ultrawideband.

According to another aspect of the present invention, there is provided an apparatus that manages frequency subband allocation in a communication system which uses frequency subbands at predetermined intervals, the apparatus comprising: a determining unit, which determines whether usage of a first frequency band including upper frequency subbands is necessary; and a negotiator, which, if it is determined that the usage of the first frequency band is necessary, does not set usage permission for the first frequency band to the device or grant access to the first frequency band if a request for usage of the first frequency band is received from the device.

It is preferable that the apparatus further comprises a scanner, which scans subbands of a second frequency band including lower frequency subbands.

It is preferable that the communication system uses an ultrawideband.

According to another aspect of the present invention, there is provided a computer readable medium having recorded thereon a computer readable program for performing the method.

BRIEF DESCRIPTION OF THE DRAWINGS

The above and other features and advantages of the present invention will become more apparent by describing in detail exemplary embodiments thereof with reference to the attached drawings in which:

FIG. 6 illustrates a frequency hopping sequence of a low frequency group and a high frequency group according to an embodiment of the present invention;

DETAILED DESCRIPTION OF THE INVENTION

Hereinafter, with reference to the accompanying drawings, an exemplary embodiment of the present invention will now be described.

FIG. 6 illustrates a frequency hopping sequence of a low frequency group and a high frequency group according to an embodiment of the present invention.

Referring to FIG. 6, 6 piconets simultaneously use 6 hopping patterns respectively allocated thereto. A first piconet simultaneously uses the same frequency hopping sequences in a low frequency group and a high frequency group thus transmitting more data than a piconet using only the low frequency group. However, the other piconets can sufficiently transmit data only in the low frequency group, and therefore transmit data using only frequency subbands of the low frequency group without using frequency subbands of high frequency group.

Since the frequency subbands of the low frequency group are allocated to 6 different piconets, no other piconets can be generated. Furthermore, since the piconets other than the first piconet do not use subbands of the high frequency group, a waste of frequencies occurs.

If a potential new piconet PNC senses that 6 hopping sequences are already used while seeking for a frequency subband by scanning 14 subbands, the potential new piconet PNC cannot be formed. However, since the piconets other than the first piconet use only the frequency subbands of the low frequency group, the frequency subbands of the high frequency group are free.

In the above-described situation, the frequency subbands of the high frequency groups can be used as follows.

First, a potential new piconet PNC can make the new piconet in a network by making a child piconet of an established piconet through negotiation with a PNC of the established piconet, which is not using a subband of a high frequency group, and using a hopping sequence of the established piconet. If a transmission rate higher than that of a network of a parent piconet is necessary, the child piconet PNC can transmit data using frequency hopping sequences of the low frequency group in subbands of the high frequency group in addition to the low frequency group.

Second, if a potential new piconet PNC cannot make a new piconet because all hopping sequences are being used when the potential new piconet PNC is seeking a frequency hopping sequence, the potential new piconet PNC obtains a usage right of a subband of a high frequency group through a negotiation with a PNC of a piconet which is not using the subband of the high frequency group.

Figure 1:
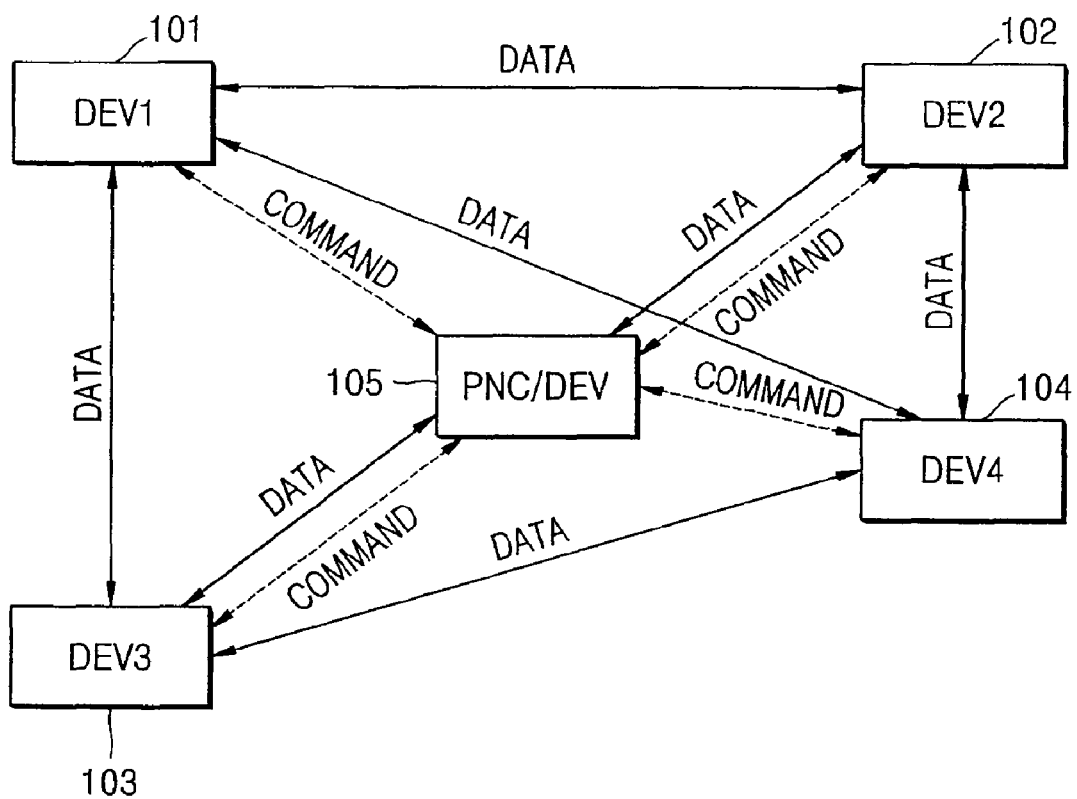
FIG. 1 illustrates a network topology according to the IEEE 802.15.3 standard.
Figures 2, 3:
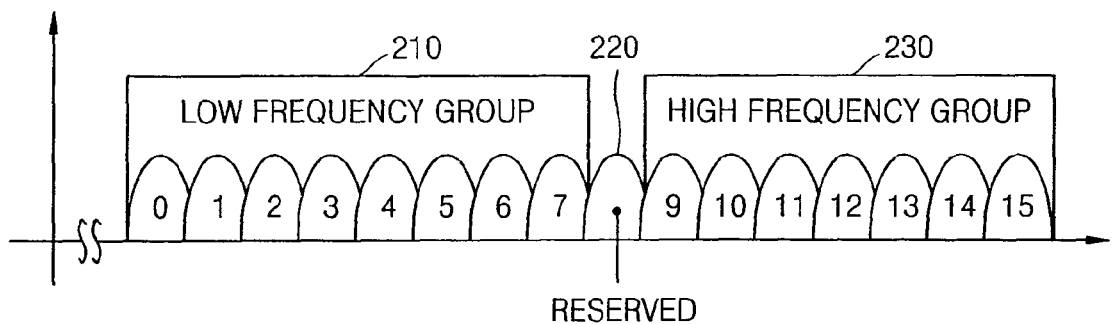
FIG. 2 illustrates a distribution of a frequency band in a conventional UWB wireless communication system.
FIG. 3 illustrates frequency hopping sequences used for the distribution of the frequency band of FIG. 2.
Figures 4, 5:
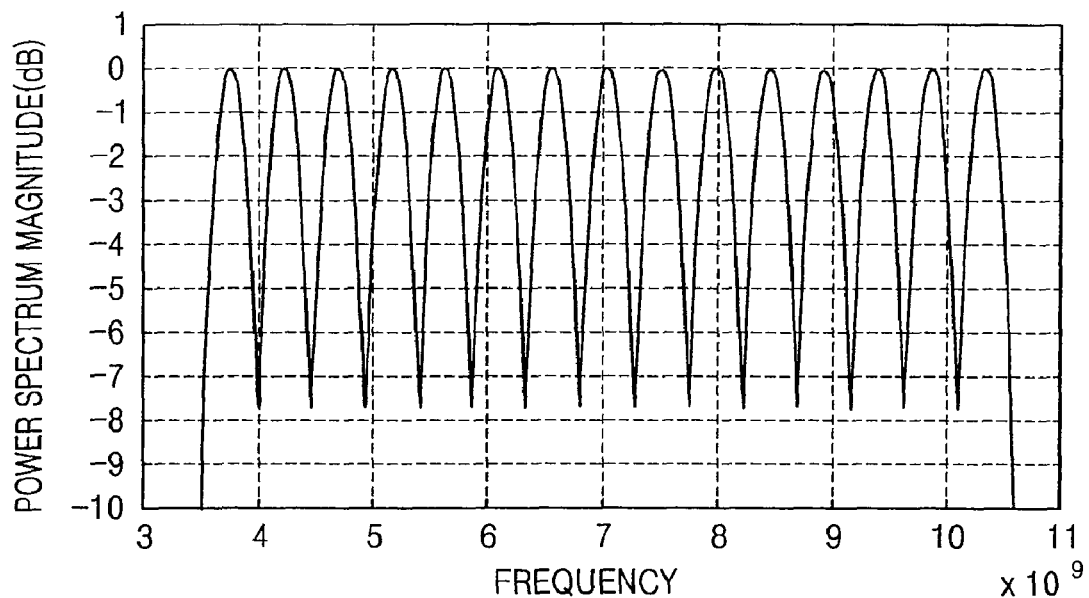
FIG. 4 illustrates another distribution of a frequency band in a conventional UWB wireless communication system.
FIG. 5 illustrates frequency hopping sequences used for the distribution of the frequency band in FIG. 4.
Figure 7A:
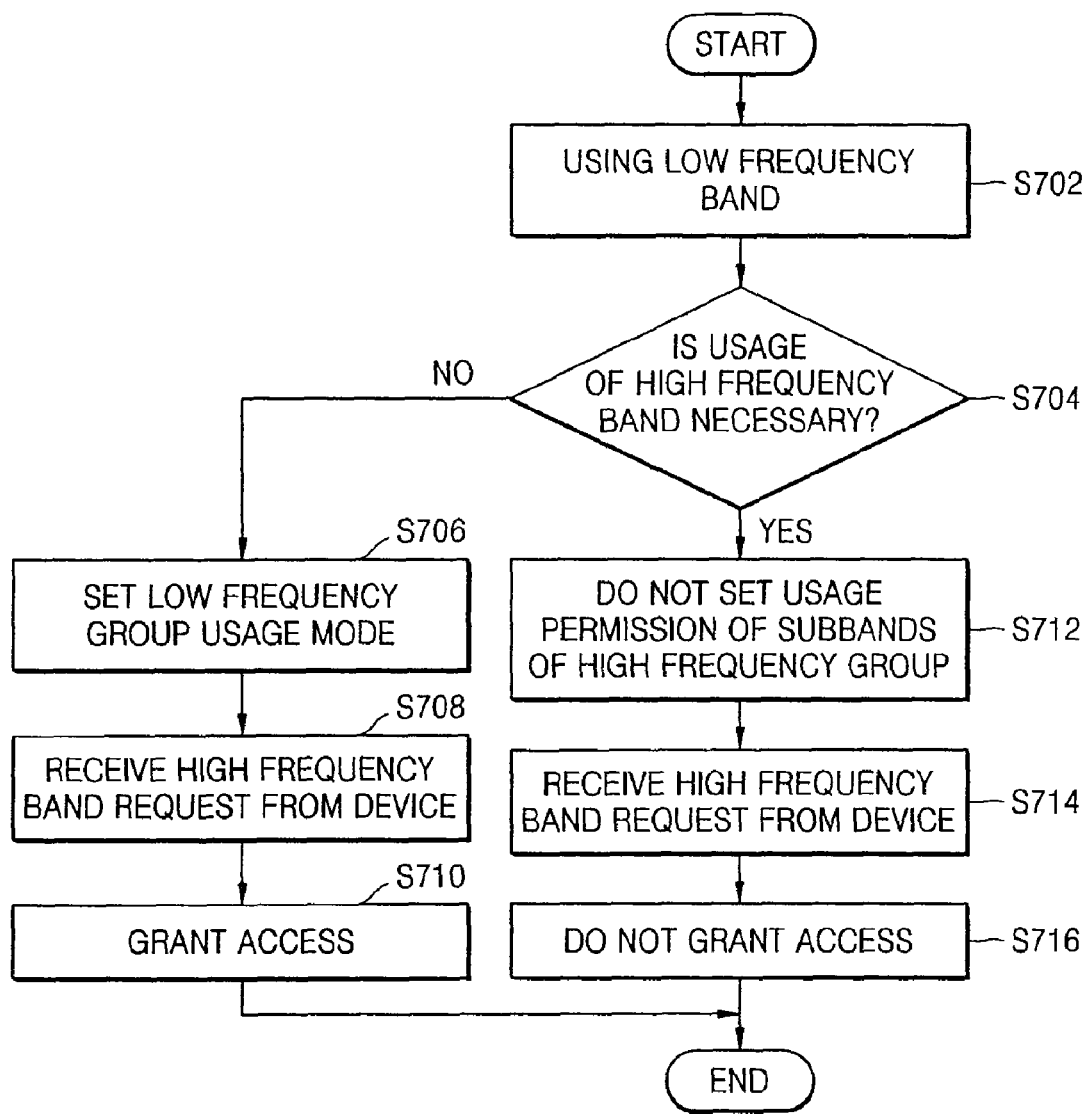
FIG. 7A is a flowchart illustrating an operation of a parent piconet PNC.
Figure 7B:
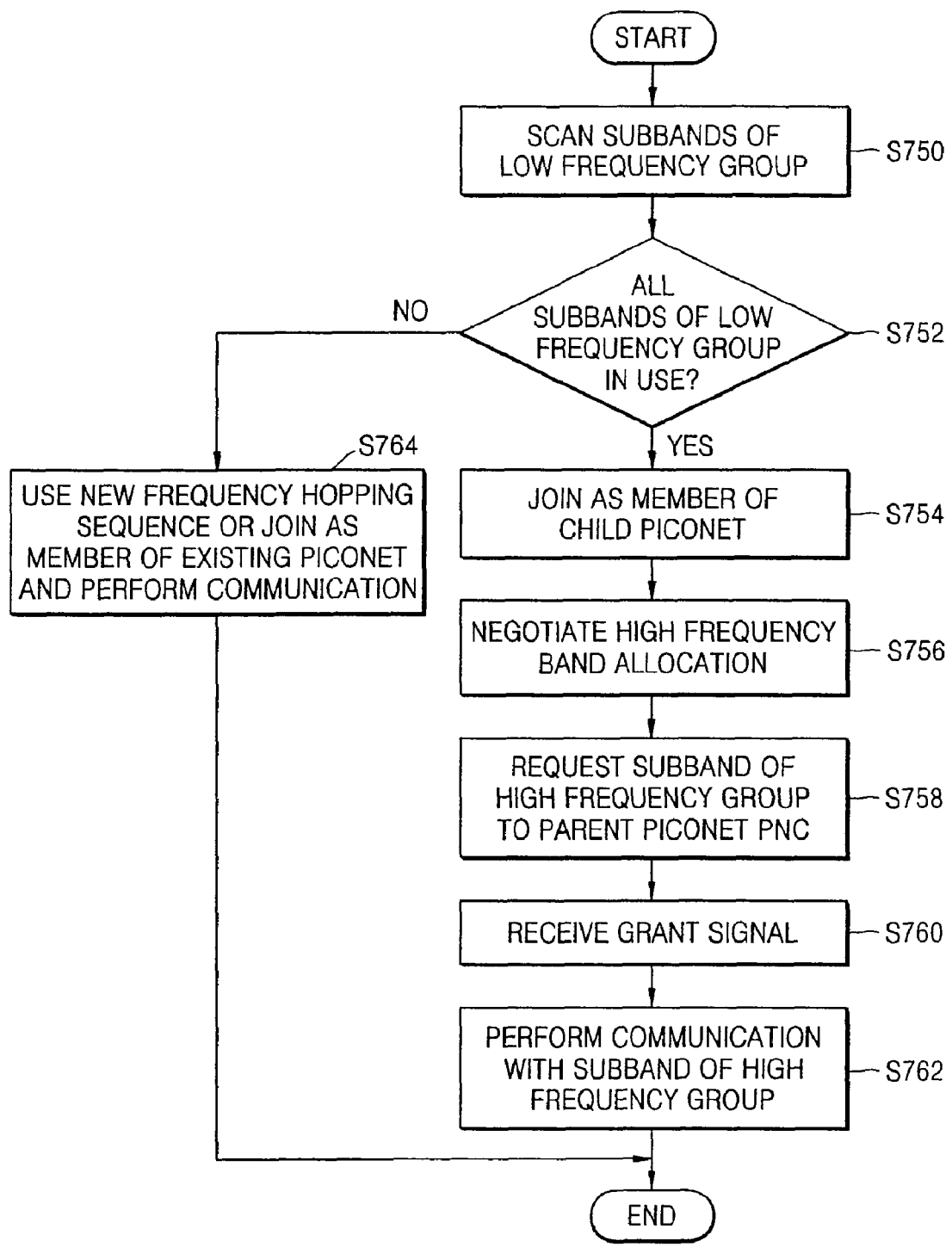
FIG. 7B is a flowchart illustrating an operation of a new piconet PNC.

Referring to FIGS. 7A and 7B, a frequency subband allocation method according to an embodiment of the present invention will now be described in detail.

FIG. 7A is a flowchart illustrating operation of a parent piconet PNC.

When a parent piconet PNC is using subbands of a low frequency group in step S702, the parent piconet PNC determines whether a usage of subbands of a high frequency group is necessary in step S704. If the usage of the subbands of the high frequency group is unnecessary, a low frequency group usage mode is set in step S706, and if request for usage of a subband of the high frequency group is received from a device in step S708, the parent piconet PNC grants access to the high frequency band in step S710.

If the usage of the subbands of the high frequency group is determined to be necessary in step S704, usage of the subbands of the high frequency group is not permitted in step S712, and even if a request for usage of a subband of the high frequency group is received from a device in step S714, the parent piconet PNC does not grant access to the high frequency band in step S716.

FIG. 7B is a flowchart illustrating operation of a potential new piconet PNC.

A potential new piconet PNC intending to make a new piconet scans subbands of a low frequency group in step S750. The new piconet PNC determines whether all subbands of the low frequency group are being used in step S752. If a free subband of the low frequency range does not exist, the potential new piconet PNC becomes a member of a child piconet of an established piconet in step S754, and negotiates allocation of a subband of a high frequency group with the established piconet in step S756. That is, the potential new piconet PNC requests a right of usage of the subband of the high frequency group to a parent piconet PNC in step S758, and if the potential new piconet PNC receives a grant signal in step S760, the new piconet PNC performs communication in the subband of the high frequency group in step S762.

If it is determined that a free subband of the low frequency group does exist in step S752, the potential new piconet PNC determines whether to generate a new frequency hopping pattern or become a member of a current piconet, and performs communication in the determined frequency subband in step S764.

Figure 8A:
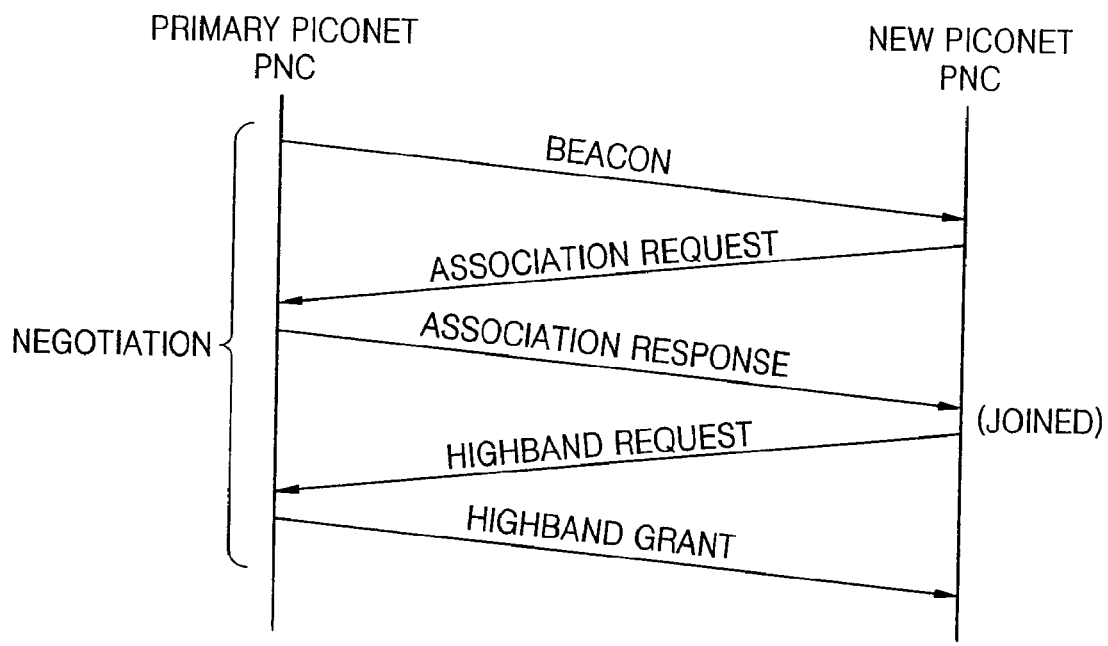
FIG. 8A illustrates a protocol between a parent piconet PNC (or a primary piconet PNC) and a new piconet PNC.

FIG. 8A illustrates a protocol between a parent piconet PNC (or a primary piconet PNC) and a potential new piconet PNC.

Referring to FIG. 8A, when a primary piconet PNC transmits a beacon signal to a potential new piconet PNC, the potential new piconet PNC becomes a member of the primary piconet through association request and association response procedures in response to the beacon signal. After joining, the potential new piconet PNC transmits a high frequency group request signal and receives a grant signal. Then, the new piconet is formed.

Figure 8B:
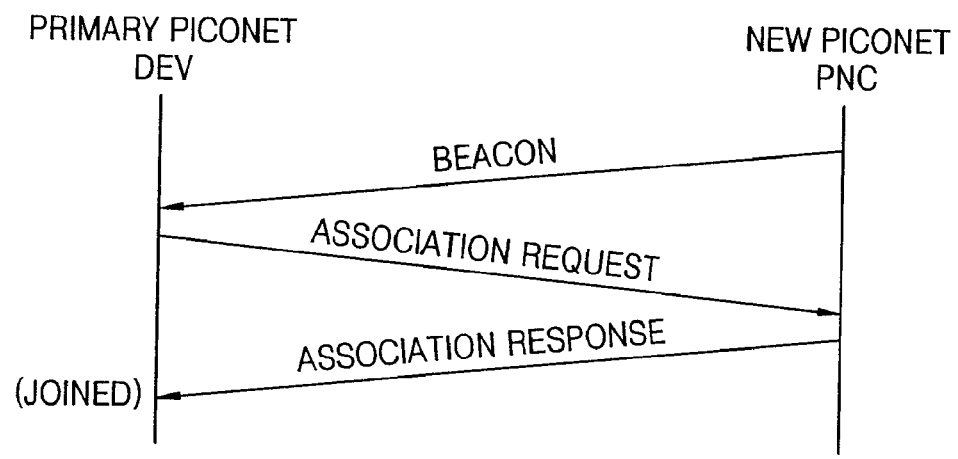
FIG. 8B illustrates a protocol between a primary piconet device and a new piconet PNC of a new piconet.

FIG. 8B illustrates a protocol between a primary piconet device and a new piconet PNC of a new piconet in a high frequency band.

When the new piconet PNC transmits a beacon signal to the primary piconet device during an operation, if the primary piconet device wants to become a member of the new piconet in a high frequency group, the primary piconet device becomes a member of the new piconet through association request and association response procedures.

Figure 9:
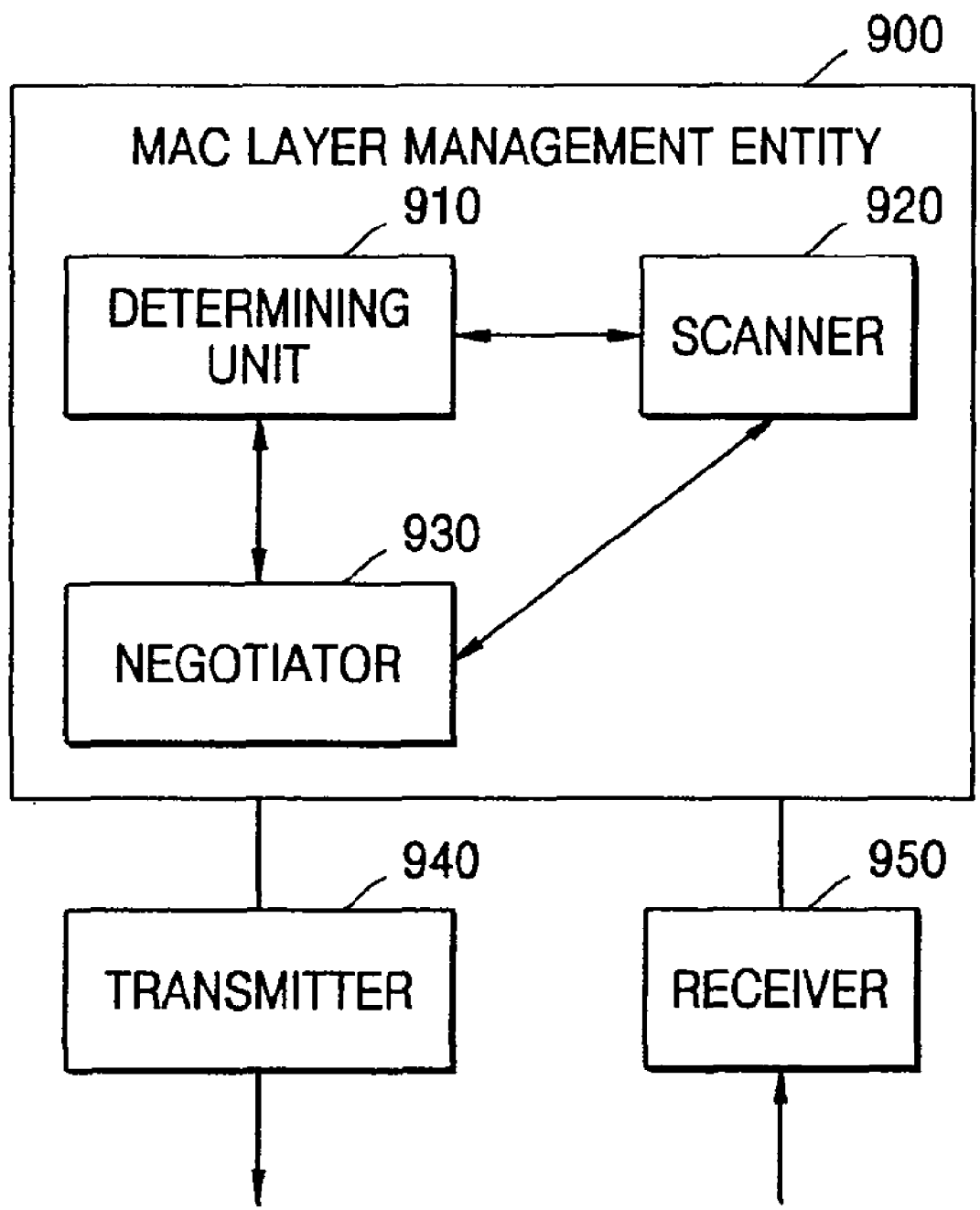
FIG. 9 is a block diagram of a frequency band allocation management apparatus.

FIG. 9 is a block diagram of a frequency band allocation management apparatus.

Referring to FIG. 9, frequency band allocation management is performed in a media access controller (MAC) layer management entity 900. The MAC layer management entity 900 includes a determining unit 910, a scanner 920, and a negotiator 930.

The determining unit 910 determines whether usage of a first frequency band including upper frequency subbands is necessary.

If it is determined that the usage of the first frequency band is necessary, the negotiator 930 does not set usage permission for the first frequency band or grant access to the first frequency band even if a request for usage of the first frequency band is received.

The scanner 920 scans subbands of a second frequency band including lower frequency subbands.

A PNC and a device include the MAC layer management entity 900, a transmitter 940, and a receiver 950.

The present invention may be embodied in a general-purpose computer by running a program from a computer readable medium, including but not limited to storage media such as magnetic storage media (ROMs, RAMs, floppy disks, magnetic tapes, etc.), optically readable media (CD-ROMs, DVDs, etc.), and carrier waves (transmission over the internet). The present invention may be embodied as a computer readable medium having a computer readable program code unit embodied therein for causing a number of computer systems connected via a network to effect distributed processing. And the functional programs, codes and code segments for embodying the present invention may be easily deducted by programmers in the art which the present invention belongs to.

As described above, when generation of a new piconet is necessary or generation of a new piconet is requested in a multi-piconet environment, since subbands of a high frequency group are allocated through negotiation, frequency resources are efficiently managed.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of requesting frequency subband allocation in a communication system which uses frequency subbands at predetermined intervals, the method comprising:
scanning low frequency subbands of a low frequency band of an ultrawide frequency band that includes the low frequency band and a high frequency band that includes high frequency subbands, and determining whether all of the low frequency subbands are used;
joining, by a first device, a piconet of the communication system as a member of the piconet, in response to determining that all of the low frequency subbands are used;

requesting a subband among the high frequency subbands; and receiving a grant signal that grants use of the requested subband.

2. The method of claim 1, wherein the first device of the communication system joins the piconet as a member in response to determining that the subband among the high frequency subbands is free.

3. The method of claim 1, further comprising forming a second piconet in the granted subband.

4. The method of claim 3, wherein the second piconet is a child piconet of the piconet.

5. The method of claim 3, wherein the first device is a piconet coordinator (PNC) of the child piconet.

6. The method of claim 3, wherein the piconet uses a hopping sequence in the low frequency band and the second piconet uses the hopping sequence in the high frequency band.

* * * * *